US007584025B2

(12) United States Patent
Tanaka

(10) Patent No.: US 7,584,025 B2
(45) Date of Patent: Sep. 1, 2009

(54) IN-VEHICLE DEVICE, COMPUTER READABLE MEDIUM FOR CONTROLLING THE SAME, AND METHOD FOR CONTROLLING NAVIGATION DEVICE

(75) Inventor: Makoto Tanaka, Anjo (JP)

(73) Assignee: DENSO CORPORATION, Kariya (KR)

( * ) Notice: Subject to any disclaimer, the term of this patent is extended or adjusted under 35 U.S.C. 154(b) by 0 days.

(21) Appl. No.: 12/232,541

(22) Filed: Sep. 18, 2008

(65) Prior Publication Data

US 2009/0076662 A1 Mar. 19, 2009

(30) Foreign Application Priority Data

Sep. 19, 2007 (JP) ............................. 2007-242273

(51) Int. Cl.
*G05D 1/08* (2006.01)

(52) U.S. Cl. ..................... 701/1; 701/4; 701/9; 701/13; 701/209

(58) Field of Classification Search ..................... 701/1, 701/4, 9, 13, 14, 207–213
See application file for complete search history.

(56) References Cited

U.S. PATENT DOCUMENTS 7,171,305 B2 1/2007 Minato et al.
7,463,955 B1 * 12/2008 Robinson et al. ............... 701/3
2007/0124029 A1 5/2007 Hattori et al.

FOREIGN PATENT DOCUMENTS

JP A-2006-351136 12/2006
JP A-2007-026620 2/2007

* cited by examiner

*Primary Examiner*—Richard M. Camby
(74) *Attorney, Agent, or Firm*—Posz Law Group, PLC

(57) ABSTRACT

An in-vehicle device includes: a hard disk drive for storing data; a communication element for transmitting a message to an user; an input element for receiving an instruction from the user; a communication control element for obtaining altitude information; and an activation control element for controlling activation of the hard disk drive. The communication control element obtains the altitude information before the hard disk drive is activated when the in-vehicle device is activated for the first time since standby power supply stopped while the in-vehicle device was not activated. The communication control element transmits the message when the current position is equal to or higher than a predetermined altitude. The activation control element starts to read the data from the hard disk drive when the input element receives the instruction that the user permits the activation of the hard disk drive.

7 Claims, 5 Drawing Sheets

START
DETECT CURRENT POSITION — S300
CHECK WITH AREA DATA — S310
CURRENT POSITION= HIGH ALTITUDE? — S320 (NO / YES)
DISPLAY MESSAGE — S330
BUTTON PUSHED? — S340 (NO / YES)
PERMIT HDD OPERATION — S350
READ DATA — S360
END

IN-VEHICLE DEVICE, COMPUTER READABLE MEDIUM FOR CONTROLLING THE SAME, AND METHOD FOR CONTROLLING NAVIGATION DEVICE

CROSS REFERENCE TO RELATED APPLICATION

This application is based on Japanese Patent Application No. 2007-242273 filed on Sep. 19, 2007, the disclosure of which is incorporated herein by reference.

FIELD OF THE INVENTION

The present invention relates to an in-vehicle device, a computer readable medium for controlling an in-vehicle device, and a method for controlling a navigation device.

BACKGROUND OF THE INVENTION

Conventionally, an in-vehicle device such as an in-vehicle navigation device includes a hard disk drive. The in-vehicle device shows a map around a current position of a vehicle on a display based on a map data. Further, the in-vehicle device calculates an optimum route to a destination so that the in-vehicle device guides a driver for a driving direction. The hard disk drive as a memory stores the map data and the like. Since the hard disk drive has a large amount of storage capacity, the hard disk drive stores not only the map data but also application software for operating the navigation device, and a music data and/or an image data for being utilized in an audio device, which is integrated with the navigation device.

The hard disk drive is a memory for recording and reading out information by using a magnetic head and a disk. The disk as a memorizing means is prepared by applying magnetic material on the disk. When the hard disk drive operates, the disk rotates with high speed, and the magnetic head floats over the disk because of pressure of air, which is pulled by the rotating disk so that the air also rotates. A distance between the magnetic head and the disk is small when the magnetic head floats over the disk. Accordingly, under a condition that environmental air pressure is very low, the distance between the head and the disk may not be sufficient when the hard disk drive operates. This is because the air pressure for floating the magnetic head is low. Thus, the head may hit on the disk so that the disk is damaged. The air pressure becomes low with increasing altitude from sea level. Therefore, the hard disk drive has service altitude limit. In general, operation guarantee of the hard disk drive with respect to the altitude is about three thousands meters (i.e., about 0.7 atm) to five thousand meters (i.e., about 0.5 atm).

Accordingly, when the in-vehicle device has the hard disk drive, it is necessary to protect the hard disk drive from damage when the in-vehicle device is used in a high land such as a 3000 meters high road, and a 4000 to 5000 meters road. In the high land, the altitude of the land exceeds the altitude limit of the hard disk drive.

When the vehicle runs on a road, the altitude of which is equal to or higher than a predetermined altitude, a part of the map data stored in the hard disk drive is transferred to an external memory. Then, the hard disk drive stops to operate, and the in-vehicle device shows a driving route based on the map data stored in the external memory when the vehicle runs on the high land having the altitude higher than the predetermined altitude such as 3000 meters. This technique is described in U.S. Pat. No. 7,171,305. Thus, by stopping the operation of the hard disk drive, the hard disk drive is protected from damage, and the in-vehicle device continues to guide the route.

Although the technique in U.S. Pat. No. 7,171,305 can protect the hard disk drive when the vehicle runs in the high land. However, if the in-vehicle device turns on at the high land, it may be difficult to protect the hard disk drive from the damage. Specifically, the above technique does not guarantee the protection of the hard disk drive when the in-vehicle device turns on initially when the vehicle is located in the high land, i.e., the above technique does not guarantee the activation of the in-vehicle device at the high land. Therefore, there are difficulties as follows.

In the conventional in-vehicle device having the hard disk drive, the data such as program is read out from the hard disk drive, and then, the data is transferred to a working memory such as a RAM. Based on the data of the working memory, the device runs. If operation data just before the end of operation at the last time is stored in the working memory, the device can be activated based on the operation data stored in the working memory without reading the data from the hard disk drive. The working memory used for the above usage is formed from a volatile memory, which requires electricity to hold to store the data therein, since it is required for the working memory to have high access speed and the like. Here, when the in-vehicle device stops to operate, the electricity for the working memory, i.e., standby power is supplied from an in-vehicle battery.

However, the battery of the vehicle may be down when the vehicle stops driving, or the power source circuit is shut down for maintenance. In this case, the standby power is not supplied to the working memory, and thereby, the data in the memory may be disappeared. Thus, when the in-vehicle device starts to operate for the next time, it is necessary to read out the program and the like from the hard disk drive and to input the program and the like into the working memory. At this moment, when the vehicle is located at the high land, the program for prohibiting the operation of the hard disk drive at the high land is also disappeared from the working memory. Accordingly, even when the current location of the vehicle is at the high altitude place, the hard disk drive is activated in case of start-up of the in-vehicle device. As a result, since the hard disk drive is activated at the high altitude place, the hard disk drive may be broken.

Thus, it is required for the hard disk drive mounted in the vehicle to protect it from breakdown even when the hard disk drive suddenly starts to function at the high altitude place.

SUMMARY OF THE INVENTION

In view of the above-described problem, it is an object of the present disclosure to provide an in-vehicle device. It is another object of the present disclosure to provide a computer readable medium for controlling an in-vehicle device. It is further another object of the present disclosure to provide a method for controlling a navigation device.

According to a first aspect of the present disclosure, an in-vehicle device for executing a predetermined process based on data includes: a hard disk drive for storing the data; a communication element for transmitting a message to a user; an input element for receiving an instruction from the user; a communication control element for obtaining altitude information relating to an altitude of a current position of a vehicle and for transmitting the message to the user via the communication element; and an activation control element for controlling activation of the hard disk drive. The communication control element obtains the altitude information before the hard disk drive is activated when the in-vehicle device is activated for the first time since standby power supply stopped while the in-vehicle device was not activated. The standby power is supplied to the in-vehicle device from a battery of the vehicle so that a working memory in the in-vehicle device holds data therein. The communication control element transmits the message when the altitude information shows that the current position is equal to or higher than a predetermined altitude. The message provides to ask the user whether the user permits the activation of the hard disk drive. The activation control element provides permission to activate the hard disk drive when the input element receives the instruction that the user permits the activation of the hard disk drive in response to the message from the communication element. The activation control element starts to read the data from the hard disk drive when the activation control element provides the permission.

In the in-vehicle device, the hard disk drive is protected from being down when the in-vehicle device is activated at the high altitude place.

According to a second aspect of the present disclosure, a computer readable medium comprising instructions being executed by a computer, the instructions including a computer-implemented method for controlling the in-vehicle device according to the first aspect of the present disclosure. In the medium, the hard disk drive is protected from being down when the in-vehicle device is activated at the high altitude place.

According to a third aspect of the present disclosure, a method for controlling a navigation device, which guides a route to a destination, the method includes: storing a map data in a hard disk drive; obtaining altitude information relating to an altitude of a current position of the navigation device before the hard disk drive is activated when the navigation device is activated for the first time since standby power supply stopped while the navigation device was not activated; transmitting a message to an user when the altitude information shows that the current position is equal to or higher than a predetermined altitude, wherein the message provides to ask the user whether the user permits the activation of the hard disk drive; receiving an instruction from the user; activating the hard disk drive when the instruction that the user permits the activation of the hard disk drive in response to the message; and reading the map data from the hard disk drive when the hard disk drive is activated. The standby power is supplied to the navigation device from a battery so that a working memory in the navigation device holds data therein. In the above method, the hard disk drive is protected from being down when the in-vehicle device is activated at the high altitude place.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
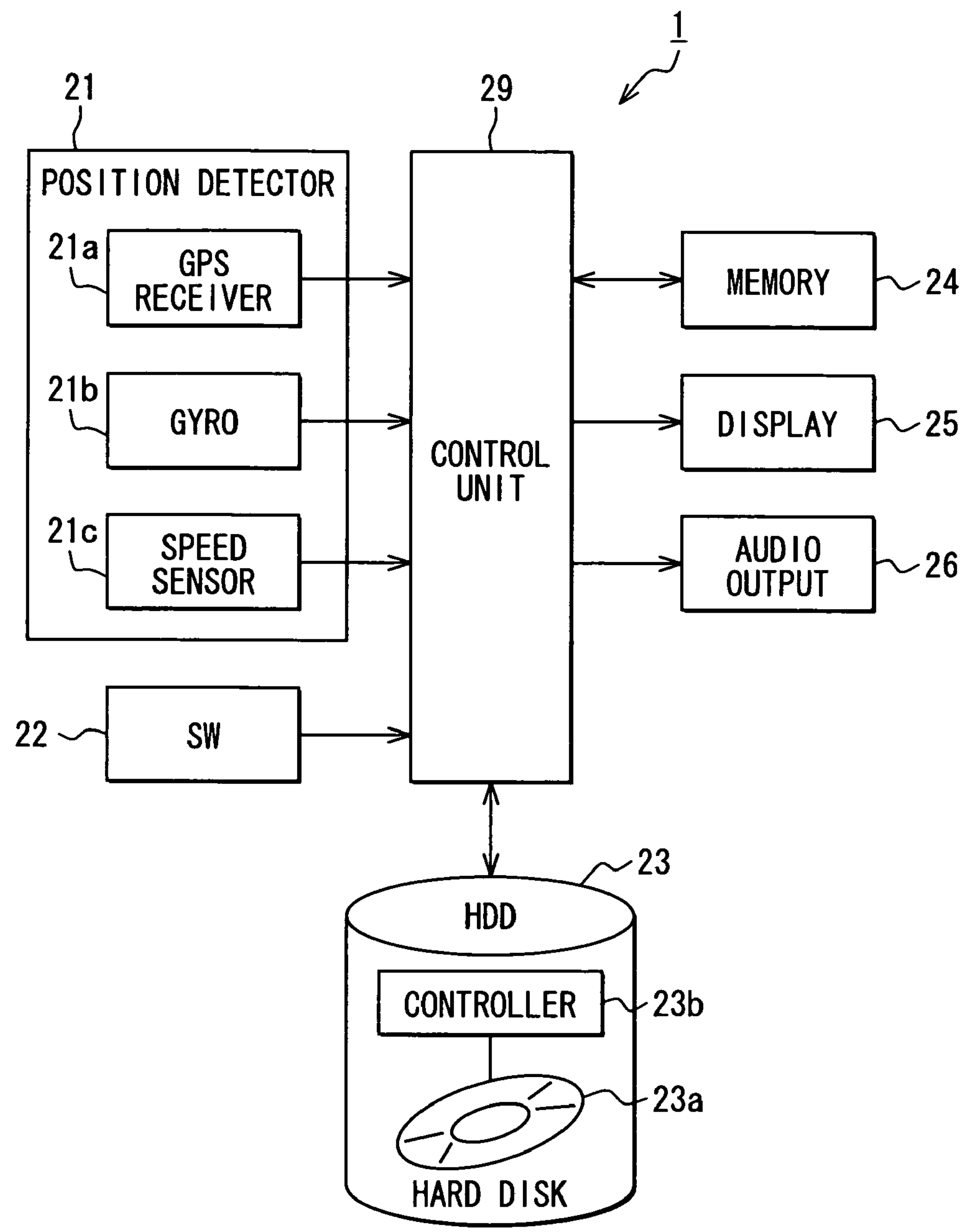
FIG. 1 is a block diagram showing an in-vehicle navigation device.

An in-vehicle navigation device 1 according to a first embodiment is shown in FIG. 1.

As shown in FIG. 1, the navigation device 1 includes a position detection device 21, multiple operation switches 22, a hard disk drive 23, an external memory 24, a display 25, an audio output device 26 and a control unit 29. The position detection device 21 detects a current position of a vehicle. A user inputs various instructions to the control unit 29 by using the operation switches 22. The hard disk drive (HDD) 23 as a large amount information memorizing device stores large amount of information such as a map data and a program. The external memory 24 stores various information. The display 25 displays various information such as a map image. The audio output device 26 such as a speaker outputs audio guidance and the like.

The position detection device 21 includes a GPS receiver 21*a*, a gyroscope 21*b*, and a speed sensor 21*c*. The GPS receiver 21*a* receives a radio wave transmitted from an artificial satellite for GPS via a GPS antenna so that the position detection device 21 detects a position coordinate of the vehicle. The gyroscope 21*b* outputs a detection signal corresponding to an angular speed of rotation of the vehicle. The speed sensor 21*c* outputs a detection signal corresponding to a speed of the vehicle. Each of the GPS receiver 21*a*, the gyroscope 21*b*, and the speed sensor 21*c* has its own error with independent or different error source, respectively. Thus, the GPS receiver 21*a*, the gyroscope 21*b*, and the speed sensor 21*c* complement each other for compensating the error.

The switches 22 are formed from a touch panel switch disposed on a screen of the display 25, and a mechanical switch arranged around the display 25.

The hard disk drive 23 includes a hard disk 23*a* and a controller 23*b*, which are integrated. The hard disk 23*a* stores information. The controller 23*b* has a magnetic head, a drive element, a control element and the like so that the controller 23*b* writes the information in the hard disk 23*a* and read out the information from the hard disk 23*a*. The hard disk drive 23 read the data from the hard disk 23*a* based on a control signal from the control unit 29, and then, the hard disk drive 23 inputs the data in the control unit 29. The data memorized in the hard disk drive 23 is, for example, a map data including a road data and a drawing data, a route guiding data and various data such as a program for operating the navigation device 1. The road data is used for map matching, route searching, route guiding and the like. The drawing data includes various data for displaying the map. The hard disk drive 23 may be guaranteed to operate normally under a condition that the altitude is equal to or lower than 5000 meters, and the air pressure is equal to or higher than 0.5 atm.

The external memory 24 stores a program for operating the navigation device 1, an area data for determining whether it is a high altitude place, a flag for the high altitude place corresponding to the high altitude information obtained by drive of the vehicle, and other information. The external memory 24 is formed from a memory such as a nonvolatile semiconductor memory that is capable of re-writing the memorized data electrically or magnetically, and memorizing the data even when a power source stops energizing the memory.

The display 25 is a color display having a screen formed of a crystal display for displaying a color image. The display 25 is capable of displaying various images on the screen in accordance with an image signal from the control unit 29. For example, when the vehicle runs, the display 25 displays a navigation image including a mark for representing the current position of the vehicle in the map data, a guiding route to a destination, a name of a landmark, a marker, a symbol of the landmark and the like, which are overlapped to each other. The mark in the map data is specified based on the current position of the vehicle detected by the position detection device 21 and the map data input from the hard disk drive 23. Here, the mark, the guiding route, the name of the landmark, the marker and the symbol of the landmark are additional data.

The audio output device 26 informs a user of various information by voice or sound. Thus, the navigation device 1 supports, i.e., guides the route to the destination, and notices various information to the user by using both the information displayed in the display 25 and the audio output from the audio output device 26.

The control unit 29 mainly includes a micro computer having a CPU, a ROM, a RAM, an I/O element, a bus line and the like. The control unit 29 controls various components in the navigation device 1. The control unit 29 executes various process based on the program and various data, which are input from the ROM, the hard disk drive 23, the external memory 24 and the like.

For example, a process relating to navigation is, for example, a map display process, a route guide process and the like. The map display process executes to calculate the current position of the vehicle based on the detection signal from the position detection device 21, and to display the map around the current position in the display 25. The map is read from the hard disk drive 23. The route guide process executes to calculate an optimum route to the destination from the current position based on a spot data stored in the hard disk drive 23 and the destination set by operation of the switches 22 by the user, and to guide to the destination in view of the current position and the optimum route. A method for automatically searching and setting the optimum route is, for example, a cost calculating technique by using a Dijkstra method.

The navigation device 1 may be used at a place having an altitude higher than a predetermined upper limit of the hard disk drive 23. The hard disk drive 23 is guaranteed to function normally at a place having an altitude equal to or lower than the upper limit. The upper limit is, for example, 5000 meters. When the vehicle runs and reaches the high altitude place higher than 5000 meters, the hard disk drive 23 stops operating, so that breakdown of the hard disk drive 23 caused by use of the hard disk drive 23 at the high altitude place is prevented.

A program for prohibiting operation of the hard disk drive 23 at the high altitude place when the vehicle runs is transferred from the hard disk drive 23 to the working memory such as the RAM in the control unit 29 when the navigation device 1 starts to operate. The control unit 29 functions base on the data stored in the working memory. When the operation data just before the end of the last operation of the navigation device 1 is stored in the working memory, the device 1 can execute the process based on the operation data stored in the working memory without reading the data from the hard disk drive 23. Specifically, at the last time, the operation data just before the end of operation has been stored in the working memory, the device 1 can execute the process without operating the hard disk drive 23.

The working memory used for the above usage is formed of a volatile memory in view of access speed and the like, the volatile memory which needs electric power to hold the data in the memory. During a pause of the navigation device 1, standby power for holding the data in the memory is supplied from the battery of the vehicle. However, if the battery is down when the vehicle stops driving, or if the power source circuit is shut down for maintenance, the standby power is not supplied to the working memory. In this case, the program for prohibiting operation of the hard disk drive 23 is disappeared from the working memory. Accordingly, at the next activation time, it is necessary to read the program from the hard disk drive 23. Unless, the process in the program does not function.

In this embodiment, to protect the hard disk drive 23 from operating at the high altitude place when the navigation device 1 is activated after the standby power is not supplied to the working memory, the control unit 29 executes a process for controlling activation of the hard disk drive. The control unit 29 determines whether the current position of the vehicle is located at the high altitude place when the navigation device 1 starts to operate for the first time after the battery stops supplying the standby power to the working memory. When it is determined that the current position is located at the high altitude place, the device 1 informs the user of a message and makes an inquiry for the user. The message notices possibility of breakdown of the hard disk drive 23 to the user if the hard disk drive 23 starts to function at the high altitude place. The inquiry is a question for asking whether operation of the hard disk drive 23 is permitted. Here, while this step, the operation of the hard disk drive 23 is prohibited. When the user permits to operate the hard disk drive 23, the hard disk drive is capable of activating for the first time after the standby power is not supplied to the working memory. Then, the device 1 starts to read the data from the hard disk drive 23. The process for controlling activation of the hard disk drive will be explained later.

The display 25 and the audio output device 26 provide an informing means. The switches 22 provide an input means. The control unit 29 provides an informing control means, an activation control means, and an altitude information memorizing means. The position detection device 21 and the control unit 29 provide an altitude detection means. The external memory 24 provides a memorizing means.

The process for memorizing altitude information and the process for controlling activation, which are executed by the control unit 29, will be explained with reference to FIGS. 2-5.

Figure 2:
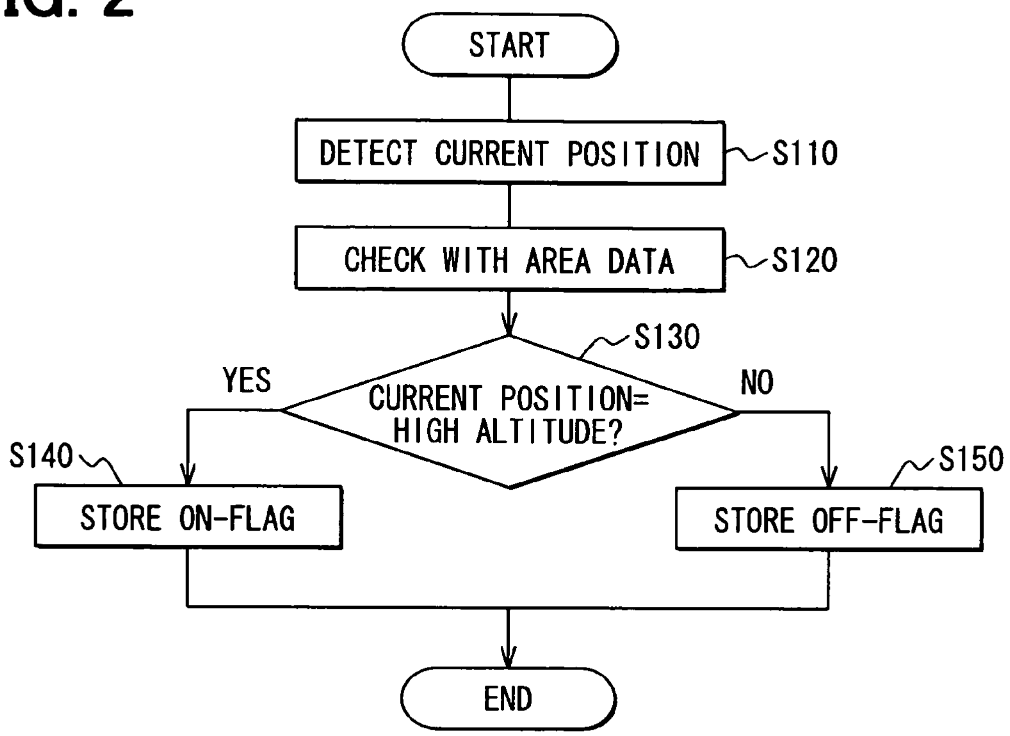
FIG. 2 is a flowchart showing a process for memorizing altitude information.

FIG. 2 shows a flowchart of the process for memorizing altitude information. This process is performed repeatedly at predetermined intervals together with the process for displaying the map and the process for guiding the route when the vehicle runs.

In Step S110, the control unit 29 detects the current position of the vehicle based on the input signal from the position detection device 21. Then, in Step S120, the control unit 29 checks the current position with an area data for determining high altitude place, which is memorized in the external memory 24.

The area data for determining high altitude place will be explained with reference to FIGS. 3A and 3B. The map coordinate plane is divided into multiple areas in a mesh manner at predetermined longitude intervals and predetermined latitude intervals. The area data for determining high altitude place is data such that a code is allocated in each divided area. The code distinguishes whether the divided area is a high altitude place.

Figure 3A:
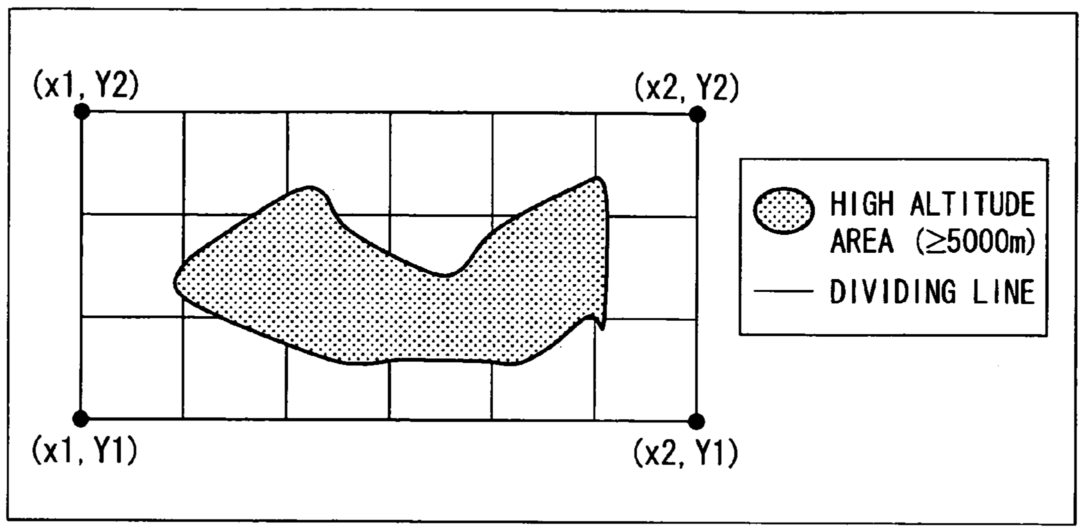
FIG. 3A is a plan view showing a divided map coordinate image.
Figure 3B:
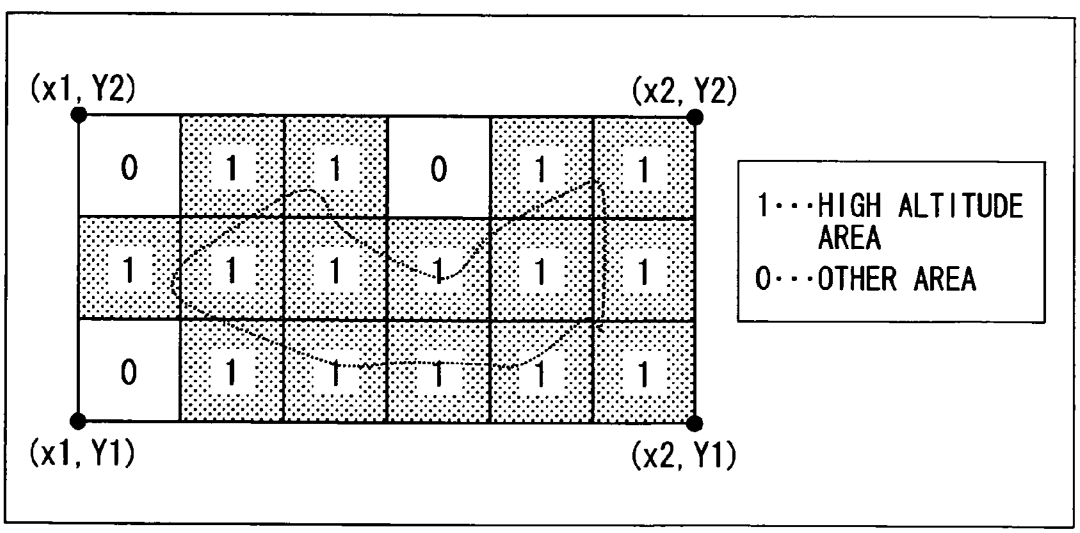
FIG. 3B is a plan view showing area data for determining high altitude place in the coordinate image.

For example, as shown in FIG. 3A, a map coordinate region has four corners, which have coordinates of longitude and latitude of (X1, Y1), (X2, Y1), (X1, Y2) and (X2, Y2). In FIGS. 3A and 3B, it will be assumed that the high altitude place is disposed at a center of the map coordinate region in a spot manner. The high altitude place has the altitude equal to or larger than 5000 meters. When the area data for determining high altitude place is prepared with regard to the map coordinate region, the map coordinate region is divided into multiple areas. As shown in FIG. 3B, when the divided area includes at least a part of the high altitude place, the code of "1" is allocated in the divided area. Here, the code of "1" represents that the divided area is the high altitude place. When the divided area does not include the high altitude place, the code of "0" is allocated in the divided area. Here, the code of "0" represents that the divided area is other than the high altitude place. Thus, the area data for determining high altitude place is preliminarily stored in the external memory 24. The area data as a table data defines whether each divided area is the high altitude place so that a part of or a whole of the map coordinate region shown as the map data stored in the hard disk drive 23 is defined by the area data.

In Step S120 in FIG. 2, a corresponding divided area of the coordinate of the current position determined in Step S110 is checked or verified from the table data in the area data for determining high altitude place. The code, which is allocated in the corresponding divided area, is read out from the table data. Based on the code of the corresponding divided area, in Step S130, it is determined whether the current position is located in the high altitude area. When it is determined that the current position is located at the high altitude place, i.e., in Step S130, it is decided as "YES," more specifically, when the area data of the corresponding divided area, which corresponds to the current position, represents "1," in Step S140, a high altitude flag turns on, and the on-flag is stored in the external memory 24. Here, when the high altitude flag turns on, the current position is located at the high altitude place. When it is determined that the current position is not located at the high altitude place, i.e., in Step S130, it is decided as "NO," more specifically, when the area data of the corresponding divided area, which corresponds to the current position, represents "0," in Step S150, a high altitude flag turns off, and the off-flag is stored in the external memory 24. Here, when the high altitude flag turns off, the current position is not located at the high altitude place.

The high altitude flag may be stored in a nonvolatile memory (not shown) in the controller 23*b* of the hard disk drive 23. In this case, the high altitude flag may be used for information to prohibit operation of the hard disk drive 23.

Figure 4:
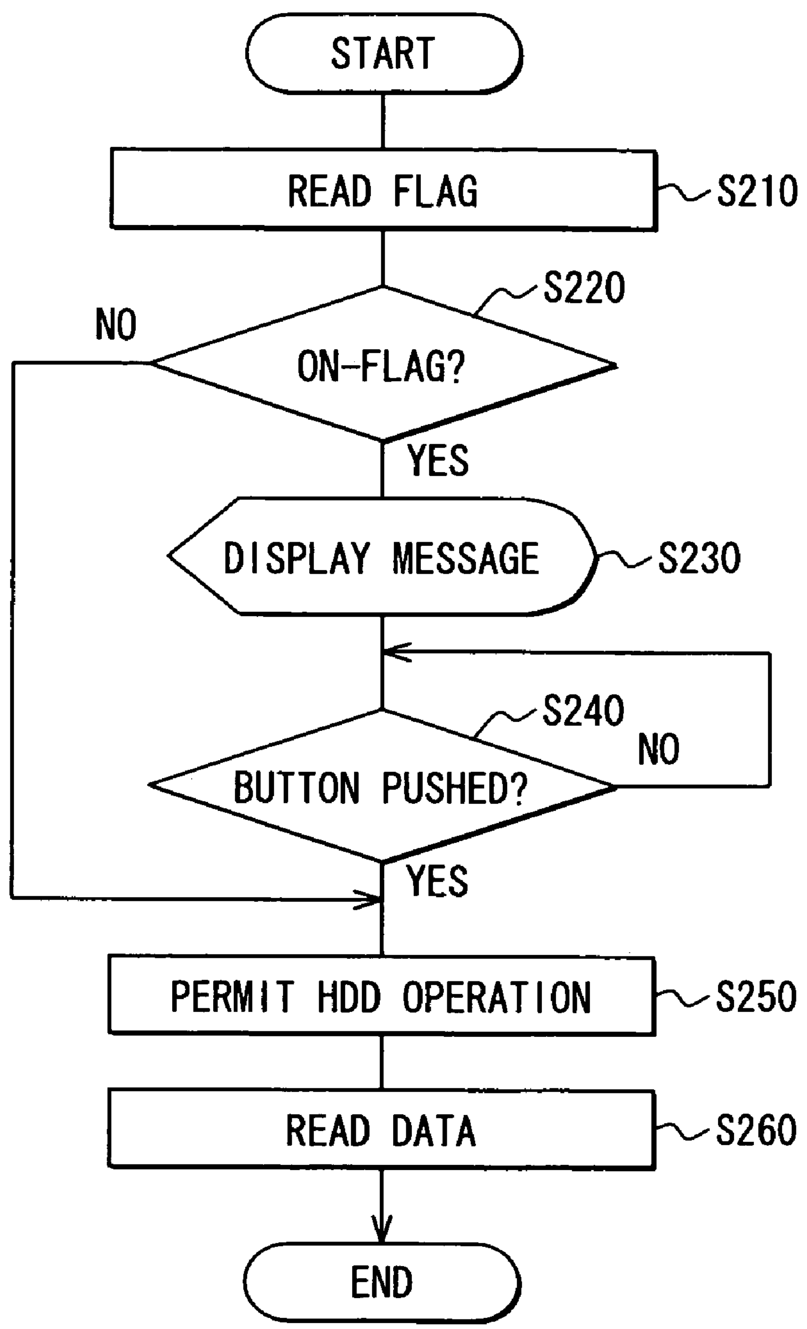
FIG. 4 is a flowchart showing a process for controlling activation of a hard disk drive.

FIG. 4 shows a process for controlling activation of the hard disk drive 23, which is executed by the control unit 29. A program for executing the process is stored in a memory other than the hard disk drive 23. For example, the program is stored in the ROM of the control unit 29 or the external memory 24. This process is executed at a time when the navigation device 1 is firstly activated after standby power supply is stopped while the navigation device 1 is paused. Specifically, accessory switch of the vehicle switches from an off-state to an on-state.

In Step S210, the control unit 29 read the high altitude flag stored in the external memory 24 when the accessory switch turns on. Here, the external memory 24 holds the high altitude flag, which has been stored at the end of the last operation in the process for memorizing altitude information shown in FIG. 2.

In Step S220, it is determined whether the read flag is an on-flag. When it is determined that the flag is an off-flag, i.e., it is decided as "NO," the process proceeds to Step S250. When it is determined that the flag is an on-flag, i.e., it is decided as "YES," the process proceeds to Step S230. In Step S230, a message is displayed on the display 25. The message is, for example, advice that the hard disk drive 23 may be down if the hard disk drive 23 is activated at the high altitude place, or inquiry for a user whether the user permits to activate the hard disk drive 23. Here, a voice message similar to the message displayed on the display 25 may be output from the audio output device 26.

Figure 5:
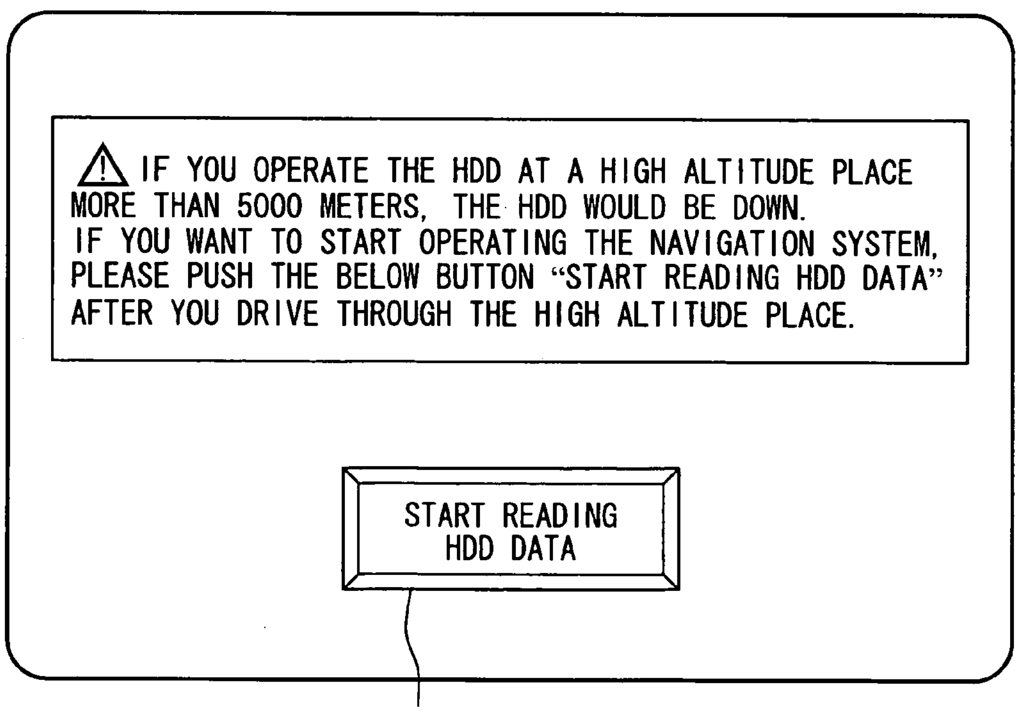
FIG. 5 is a display example for inquiry of operation of the hard disk drive.

FIG. 5 shows an example of the message displayed on the display 23. On the image of the display 25, the advice message such that "if you operate the HDD at the high altitude place higher than 5000 meters, the HDD may be down," or the inquiry message such that "when you starts to operate the navigation device, please push a HDD data read start button on the screen after your car is escaped from the high altitude place" are displayed. The inquiry message provides to ask the user whether the user permits the operation of the hard disk drive.

The HDD data read start button 251 is disposed on the screen under the message. The HDD data read start button 251 is a GUI linked with the touch panel formed on the screen of the display 25. When the user pushes or touches the button 251 in the image, the user inputs permission of operation of the hard disk drive 23.

In Step S230 of FIG. 4, the message for asking the user whether the user permits operation of the hard disk drive 23 is displayed. Then, in Step S240, it is determined whether the user pushes the HDD data read start button 251. Here, when it is determined that the user does not push the HDD data read start button 251, i.e., when it is decided as "NO," Step S240 is repeated. When it is determined that the user pushes the button 251, i.e., when it is decided as "YES," the process proceeds to Step S250. In this case, the operation of the hard disk drive 23 is prohibited while the period from the start of the process for controlling activation of the hard disk drive 23 to Step S250.

In Step S250, it is allowed that the hard disk drive 23 is activated, i.e., the hard disk drive 23 can be operated. In Step S230, the data for operation of the navigation device 1 is read out from the hard disk drive 23.

Second Embodiment

A process for controlling activation of the hard disk drive 23 according to a second embodiment, which is executed by the control unit 29, will be explained.

Figure 6:
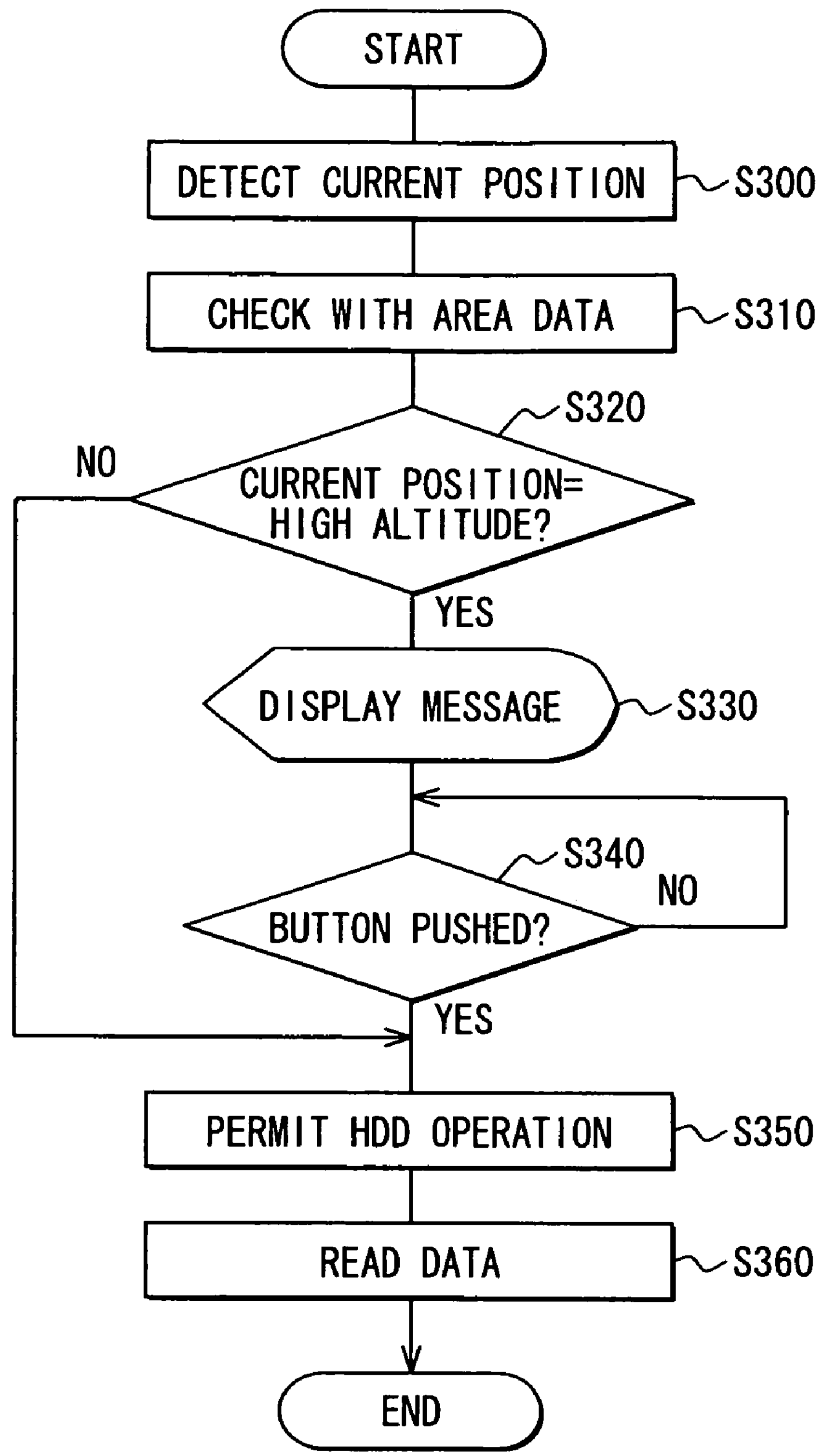
FIG. 6 is a flowchart showing a process for controlling activation of the hard disk drive, according to a second embodiment.

FIG. 6 shows a process for controlling activation of the hard disk drive 23 according to a second embodiment. A program for executing the process is stored in a memory other than the hard disk drive 23. For example, the program is stored in the ROM of the control unit 29 or the external memory 24. This process is executed at a time when the navigation device 1 is firstly activated after standby power supply is stopped while the navigation device 1 is paused. Specifically, accessory switch of the vehicle switches from an off-state to an on-state.

The difference between the process shown in FIG. 6 and the process shown in FIG. 4 is a step for determining whether the current position is located at the high altitude place. In FIG. 4, it is determined in Step S210 and S220 based on the high altitude flag, which is recorded by determination of the high altitude area while the vehicle running, whether the current position is located at the high altitude place. In FIG. 6, when the navigation device 1 is activated for the first time after the standby power supply is cut, the current position is detected in each case. Then, the detected current position is checked with the area data for determining high altitude place so that it is determined whether the current position is located at the high altitude place. Therefore, it is not necessary to add the process for memorizing altitude information.

When the accessory switch of the vehicle turns on, the control unit 29 firstly detects the current position of the vehicle based on the input signal from the position detection device 21 in Step S300. In Step S310, the control unit 29 checks the detected current position with the area data for determining high altitude place, which is stored in the external memory 24. This area data for determining high altitude place is shown in FIG. 3.

Thus, in Step S310, the divided area corresponding to the current position of the vehicle is determined based on the table data of the area data for determining high altitude place.

The control unit 29 reads the code, which is allocated in the divided area. On the basis of the check result of the area data for determining high altitude place, the control unit 29 determines in Step S320 whether the current position is located in the high altitude area. When it is determined that the current position is located in the high altitude area, i.e., it is decided as “YES,” more specifically, when the area data of the divided area corresponding to the current position is “1,” it proceeds to Step S330. When it is determined that the current position is not located in the high altitude area, i.e., it is decided as “NO,” more specifically, when the area data of the divided area corresponding to the current position is “0,” it proceeds to Step S350.

Assuming that the standby power supply for holding the contents in the working memory is cut because of run-out of the battery or maintenance when the vehicle stops driving, the hard disk drive 23 does not work unless the user permits to operate the hard disk drive 23 when it is determined that the current position is located in the high altitude area. Thus, the hard disk drive 23 does not start to operate accidentally when the navigation device 1 is activated at the high altitude place. After the vehicle moves to a low altitude place, in which the hard disk drive 23 safely operates, the user permits to operate the hard disk drive 23. The breakdown of the hard disk drive 23 at the time when the navigation device 1 starts to operate at the high altitude place is prevented. The reliability of the navigation device 1 is improved.

When the control unit 1 makes an inquiry for the user whether the user permits to operate the hard disk drive 23, the message that the hard disk drive 23 may be down when the hard disk drive 23 operates at the high altitude place is clearly presented to the user. Thus, the user can recognizes the reason why the hard disk drive 23 does not function. Accordingly, the user does not raise distrust of the hard disk drive 23 not to operate. Further, the device 1 can provide to suggest an appropriate action to the user.

Although the in-vehicle device is the navigation device 1, the in-vehicle device may be other device such as a car audio device having a hard disk drive as an external memorizing device.

The method for obtaining the altitude of the current position of the vehicle may be a method for using multiple GPS satellites equal to or more than four satellites. In this case, the GPS receiver 21*a* can receive four or more electric signals from four or more GPS satellites. The in-vehicle device measures the current position three-dimensionally based on the received electric signals, so that the altitude of the current position is specified. Thus, it is determined whether the current position is located in the high altitude area. Alternatively, the altitude may be specified based on atmosphere pressure detected by an atmosphere pressure sensor and the like.

The above disclosure has the following aspects.

According to a first aspect of the present disclosure, an in-vehicle device for executing a predetermined process based on data includes: a hard disk drive for storing the data; a communication element for transmitting a message to a user; an input element for receiving an instruction from the user; a communication control element for obtaining altitude information relating to an altitude of a current position of a vehicle and for transmitting the message to the user via the communication element; and an activation control element for controlling activation of the hard disk drive. The communication control element obtains the altitude information before the hard disk drive is activated when the in-vehicle device is activated for the first time since standby power supply stopped while the in-vehicle device was not activated. The standby power is supplied to the in-vehicle device from a battery of the vehicle so that a working memory in the in-vehicle device holds data therein. The communication control element transmits the message when the altitude information shows that the current position is equal to or higher than a predetermined altitude. The message provides to ask the user whether the user permits the activation of the hard disk drive. The activation control element provides permission to activate the hard disk drive when the input element receives the instruction that the user permits the activation of the hard disk drive in response to the message from the communication element. The activation control element starts to read the data from the hard disk drive when the activation control element provides the permission.

In the in-vehicle device, the hard disk drive is protected from being down when the in-vehicle device is activated at the high altitude place.

Alternatively, the in-vehicle device may further include: an altitude detection element for detecting the altitude of the current position and determining whether the altitude of the current position is higher than the predetermined altitude; a nonvolatile memory having nonvolatile property for holding data therein even when the nonvolatile memory is not energized; and an altitude information memory for storing the altitude information in the nonvolatile memory when the altitude detection element determines that the altitude of the current position is higher than the predetermined altitude while the vehicle runs. The altitude information shows that the altitude of the current position is higher than the predetermined altitude, and the communication control element obtains the altitude information from the nonvolatile memory when the in-vehicle device is activated for the first time since the standby power supply stopped.

Alternatively, the in-vehicle device may further include: an altitude detection element for detecting the altitude of the current position and determining whether the altitude of the current position is higher than the predetermined altitude. The communication control element obtains the altitude information from the altitude detection element when the in-vehicle device is activated for the first time since the standby power supply stopped.

Alternatively, the message may further provide to advise the user that the hard disk drive may be down when the hard disc drive is activated at a place having an altitude equal to or higher than the predetermined altitude.

Alternatively, the hard disk drive may store a map data as a part of the data, and the in-vehicle device is a navigation device for guiding a route to a destination based on the map data.

According to a second aspect of the present disclosure, a computer readable medium comprising instructions being executed by a computer, the instructions including a computer-implemented method for controlling the in-vehicle device according to the first aspect of the present disclosure. In the medium, the hard disk drive is protected from being down when the in-vehicle device is activated at the high altitude place.

According to a third aspect of the present disclosure, a method for controlling a navigation device, which guides a route to a destination, the method includes: storing a map data in a hard disk drive; obtaining altitude information relating to an altitude of a current position of the navigation device before the hard disk drive is activated when the navigation device is activated for the first time since standby power supply stopped while the navigation device was not activated; transmitting a message to an user when the altitude information shows that the current position is equal to or higher than a predetermined altitude, wherein the message provides to ask the user whether the user permits the activation of the hard disk drive; receiving an instruction from the user; activating the hard disk drive when the instruction that the user permits the activation of the hard disk drive in response to the message; and reading the map data from the hard disk drive when the hard disk drive is activated. The standby power is supplied to the navigation device from a battery so that a working memory in the navigation device holds data therein. In the above method, the hard disk drive is protected from being down when the in-vehicle device is activated at the high altitude place.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle device for executing a predetermined process based on data, comprising:

a hard disk drive for storing the data;

a communication element for transmitting a message to an user;

an input element for receiving an instruction from the user;

a communication control element for obtaining altitude information relating to an altitude of a current position of a vehicle and for transmitting the message to the user via the communication element; and an activation control element for controlling activation of the hard disk drive, wherein the communication control element obtains the altitude information before the hard disk drive is activated when the in-vehicle device is activated for the first time since standby power supply stopped while the in-vehicle device was not activated, wherein the standby power is supplied to the in-vehicle device from a battery of the vehicle so that a working memory in the in-vehicle device holds data therein, wherein the communication control element transmits the message when the altitude information shows that the current position is equal to or higher than a predetermined altitude, wherein the message provides to ask the user whether the user permits the activation of the hard disk drive, wherein the activation control element provides permission to activate the hard disk drive when the input element receives the instruction that the user permits the activation of the hard disk drive in response to the message from the communication element, and wherein the activation control element starts to read the data from the hard disk drive when the activation control element provides the permission.

2. The in-vehicle device according to claim 1, further comprising:

an altitude detection element for detecting the altitude of the current position and determining whether the altitude of the current position is higher than the predetermined altitude;

a nonvolatile memory having nonvolatile property for holding data therein even when the nonvolatile memory is not energized; and an altitude information memory for storing the altitude information in the nonvolatile memory when the altitude detection element determines that the altitude of the current position is higher than the predetermined altitude while the vehicle runs, wherein the altitude information shows that the altitude of the current position is higher than the predetermined altitude, and wherein the communication control element obtains the altitude information from the nonvolatile memory when the in-vehicle device is activated for the first time since the standby power supply stopped.

3. The in-vehicle device according to claim 1, further comprising:

an altitude detection element for detecting the altitude of the current position and determining whether the altitude of the current position is higher than the predetermined altitude, wherein the communication control element obtains the altitude information from the altitude detection element when the in-vehicle device is activated for the first time since the standby power supply stopped.

4. The in-vehicle device according to claim 1, wherein the message further provides to advise the user that the hard disk drive may be down when the hard disc drive is activated at a place having an altitude equal to or higher than the predetermined altitude.

5. The in-vehicle device according to claim 1, wherein the hard disk drive stores a map data as a part of the data, and wherein the in-vehicle device is a navigation device for guiding a route to a destination based on the map data.

6. A computer readable medium comprising instructions being executed by a computer, the instructions including a computer-implemented method for controlling the in-vehicle device according to claim 1.

7. A method for controlling a navigation device, which guides a route to a destination, the method comprising:

storing a map data in a hard disk drive;

obtaining altitude information relating to an altitude of a current position of the navigation device before the hard disk drive is activated when the navigation device is activated for the first time since standby power supply stopped while the navigation device was not activated;

transmitting a message to an user when the altitude information shows that the current position is equal to or higher than a predetermined altitude, wherein the message provides to ask the user whether the user permits the activation of the hard disk drive;

receiving an instruction from the user;

activating the hard disk drive when the instruction that the user permits the activation of the hard disk drive in response to the message; and reading the map data from the hard disk drive when the hard disk drive is activated, wherein the standby power is supplied to the navigation device from a battery so that a working memory in the navigation device holds data therein.

* * * * *

UNITED STATES PATENT AND TRADEMARK OFFICE

CERTIFICATE OF CORRECTION

PATENT NO. : 7,584,025 B2
APPLICATION NO. : 12/232541
DATED : September 1, 2009
INVENTOR(S) : Makoto Tanaka It is certified that error appears in the above-identified patent and that said Letters Patent is hereby corrected as shown below:

Title page

Item (73), Assignee should read as follows:

DENSO CORPORATION, Kariya (JP)

Signed and Sealed this
Twelfth Day of June, 2012

David J. Kappos
*Director of the United States Patent and Trademark Office*